United States Patent
Schnapp et al.

(10) Patent No.: US 7,380,067 B2
(45) Date of Patent: May 27, 2008

(54) IO-STREAM ADAPTIVE WRITE CACHING POLICY ADJUSTMENT

(75) Inventors: Michael Gordon Schnapp, Banqiao (TW); Chih-Chung Chan, Banqiao (TW)

(73) Assignee: Infortrend Technology, Inc., Chung-Ho, Taipei Hsien, Taipei (TW)

( * ) Notice: Subject to any disclaimer, the term of this patent is extended or adjusted under 35 U.S.C. 154(b) by 221 days.

(21) Appl. No.: 11/181,837

(22) Filed: Jul. 15, 2005

(65) Prior Publication Data

US 2006/0015688 A1    Jan. 19, 2006

Related U.S. Application Data

(60) Provisional application No. 60/521,910, filed on Jul. 19, 2004.

(51) Int. Cl.
*G06F 13/10* (2006.01)
(52) U.S. Cl. ..................................... 711/138
(58) Field of Classification Search ............... 711/138, 711/142, 143
See application file for complete search history.

(56) References Cited

U.S. PATENT DOCUMENTS

| 4,536,836 A | 8/1985 | Dodd et al. |
| 6,192,432 B1 | 2/2001 | Slivka et al. |
| 6,427,184 B1 | 7/2002 | Kaneko et al. |
| 2002/0156972 A1 | 10/2002 | McKnight et al. |
| 2003/0097524 A1* | 5/2003 | Brant et al. ................. 711/114 |

* cited by examiner

*Primary Examiner*—Kevin L Ellis
(74) *Attorney, Agent, or Firm*—Muncy, Geissler, Olds & Lowe, PLLC

(57) ABSTRACT

A method for performing adaptive write caching in a storage virtualization subsystem is disclosed. In this method, criteria associated with an operation state of the storage virtualization subsystem for performing write caching are first defined. Then, the characteristics of a stream of at least one write input/output (IO) request sent out by a host entity are analyzed to make a determination of whether the stream meets the criteria. Thereafter, a new write IO request by the subsystem from the host entity is received, and write caching is performed to write data associated with the new write IO request to a physical storage device (PSD) array according to the determination.

23 Claims, 14 Drawing Sheets

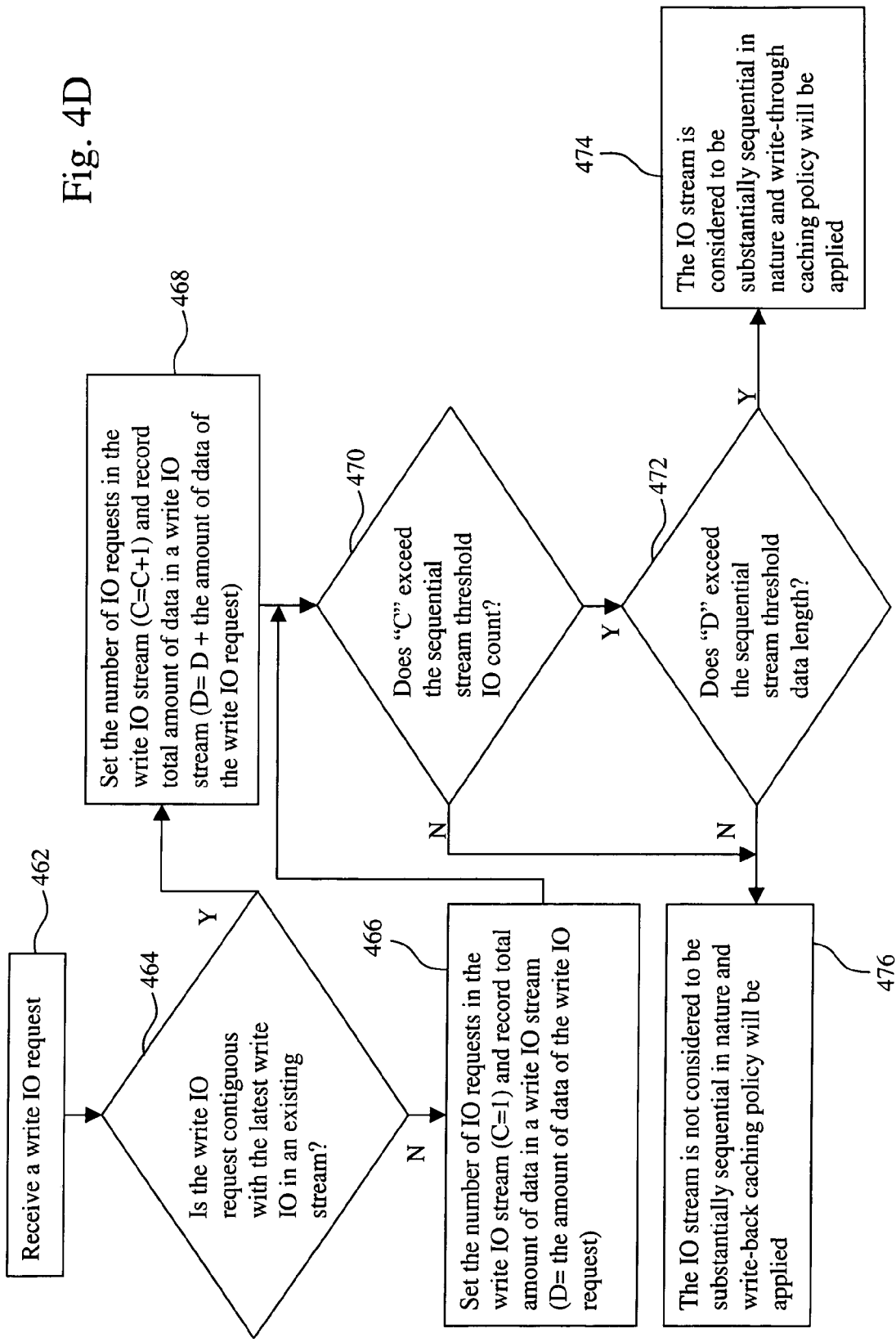

Fig. 5 sequential stream threshold IO count: 2

| Stream no. | IO requests | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| S1 | I1 c1 ns | I3 c2 ns | | | | | | I9 c3 s | I12 c4 s | | | | | | | | | | | | | | | | | | | | |
| S2 | | I2 c1 ns | | | | | | | | | | | I22 c5 s | | | | | | | | I27 c5 s | | | | | | | | |
| S3 | | | I4 c1 ns | I6 c2 ns | I7 c3 s | | | | | I16 c2 ns | I18 c3 s | | I21 c4 s | I24 c7 s | | | | | | | | | | | | | | | |
| S4 | | | | I5 c1 ns | | | | | | I15 c4 s | | I19 c5 s | I20 c6 s | | | | | | | | | | | | | | | | |
| S5 | | | | | | I8 c1 ns | I10 c2 ns | | | | | | I17 c4 s | | | | | | | | | | | | | | | | |
| S6 | | | | | | | I11 c1 ns | I13 c2 ns | | I14 c3 s | | | | | I23 c3 s | I25 c4 s | I26 c5 s | I28 c6 s | I30 c7 s | | | | | | | | | | | ns: Not Substantially Sequential
s: Substantially Sequential time →

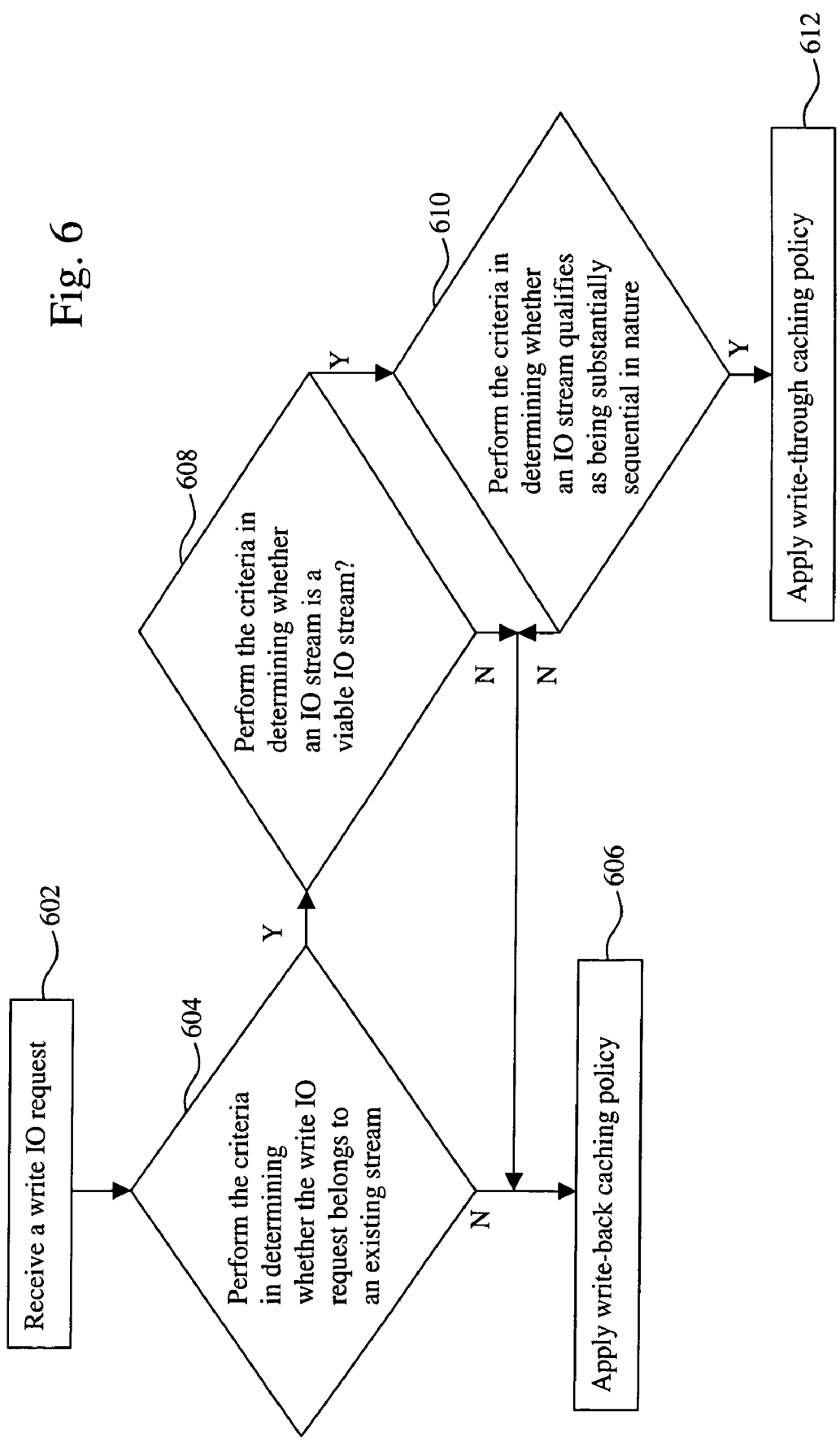

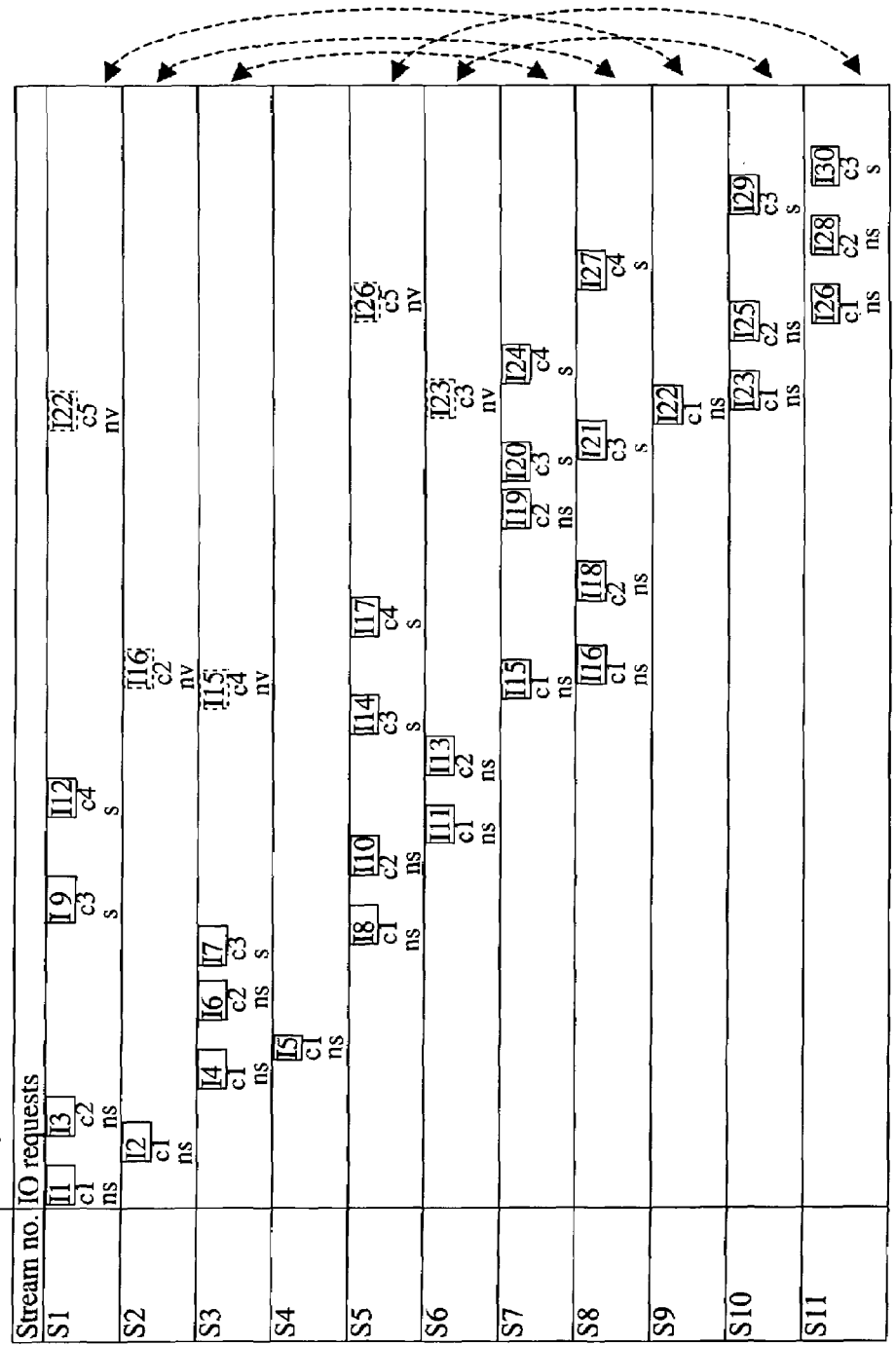

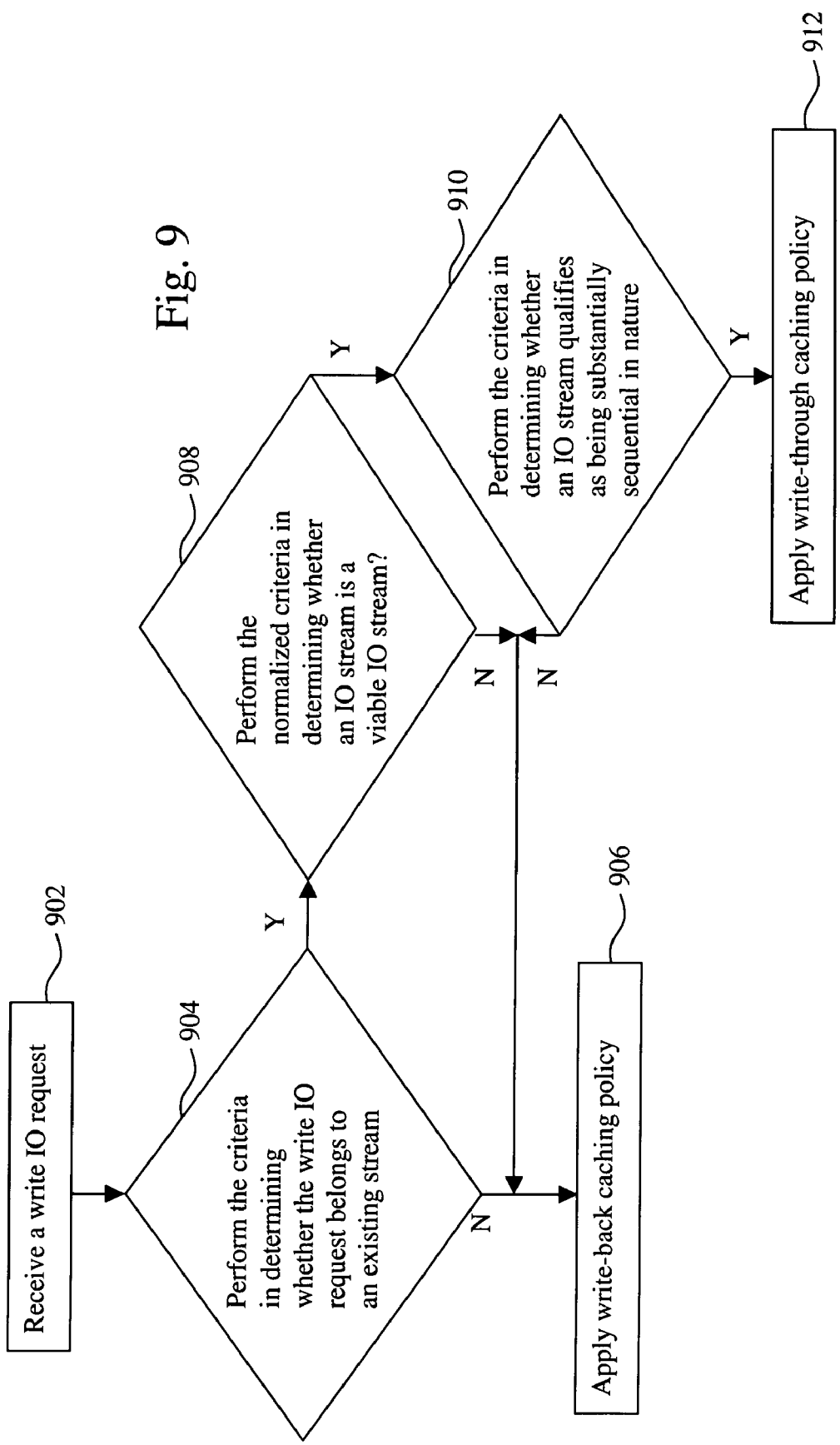

ID-STREAM ADAPTIVE WRITE CACHING POLICY ADJUSTMENT

CROSS-REFERENCE TO RELATED APPLICATION

This application claims the priority benefit of U.S. Provisional Application Ser. No. 60/521,910, filed on Jul. 19, 2004, the full disclosures of which are incorporated herein by reference.

BACKGROUND

1. Field of Invention

The present invention relates to input/output (IO) stream adaptive write caching policy adjustment in a storage virtualization subsystem.

2. Description of Related Art

Storage virtualization is a technology that has been used to virtualize physical storage by combining sections of physical storage devices (PSDs) into logical storage entities, herein referred to as logical media units that are made accessible to a host system. This technology has been used primarily in redundant arrays of independent disks (RAID) storage virtualization, which combines smaller physical storage devices into larger, fault tolerant, higher performance logical media units via RAID technology.

A logical media unit, abbreviated LMU, is a storage entity whose individual storage elements (e.g., storage blocks) are uniquely addressable by a logical storage address. One common example of a LMU is the presentation of the physical storage of a hard disk drive (HDD) to a host over the host IO-device interconnect. In this case, while on the physical level, the HDD is divided up into cylinders, heads and sectors, what is presented to the host is a contiguous set of storage blocks (sectors) addressed by a single logical block address. Another example is the presentation of a storage tape to a host over the host IO-device interconnect.

A storage virtualization controller, abbreviated SVC, is a device the primary purpose of which is to map combinations of sections of physical storage media to LMUs visible to a host system. IO requests received from the host system are parsed and interpreted and associated operations and data are translated into physical storage device IO requests. This process may be indirect with operations cached, delayed (e.g., write-back), anticipated (read-ahead), grouped, etc. to improve performance and other operational characteristics so that a host IO request may not necessarily result directly in physical storage device IO requests in a one-to-one fashion.

An external (sometimes referred to as "stand-alone") storage virtualization controller is a storage virtualization controller that connects to the host system via an IO interface and that is capable of supporting connection to devices that reside external to the host system and, otherwise, operates independently of the host.

One example of an external storage virtualization controller is an external, or stand-alone, direct-access RAID controller. A RAID controller combines sections on one or multiple physical storage devices (PSDs), the combination of which is determined by the nature of a particular RAID level, to form LMUs that are contiguously addressable by a host system to which the LMU is made available. A single RAID controller will typically support multiple RAID levels so that different LMUs may consist of sections of PSDs combined in different ways by virtue of the different RAID levels that characterize the different units.

Another example of an external storage virtualization controller is a JBOD emulation controller. A JBOD, short for "just a bunch of drives", is a set of PSDs that connect directly to a host system via one or more a multiple-device IO device interconnect channels. PSDs that implement point-to-point IO device interconnects to connect to the host system (e.g., parallel ATA HDDs, serial ATA HDDs, etc.) cannot be directly combined to form a "JBOD" system as defined above for they do not allow the connection of multiple devices directly to the IO device channel.

Another example of an external storage virtualization controller is a controller for an external tape backup subsystem.

A storage virtualization subsystem (abbreviated SV subsystem, or SVS) consists of one or more above-mentioned SVCs or external SVCs, and at least one PSD connected thereto to provide storage therefor.

Storage virtualization commonly incorporates data caching to enhance overall performance and data throughput. This data caching typically consists of caching read data and caching write data. Caching write data can further be divided into write-back caching and write-through caching. In write-back caching, the response to the host that a write operation has completed is sent out as soon as the associated data is received by the SVS and registered into the cache. It is not committed to physical media until some later time. In write-through caching, the response to the host that a write operation has completed is delayed until after the associated data is completely committed to physical media.

Write-back caching, in general, has the benefit of improving performance. By responding to the host as soon as data arrives rather than waiting until it is committed to physical media, typically more host write IOs per unit time can be processed. Furthermore, by accumulating a large amount of data in the cache before actually committing it to physical media, optimization can be performed during the commit process. Such optimizations include reducing the number of write operations to the PSDs by grouping large quantities of data into single write operations and ordering the data thereby reducing PSD mechanical latencies.

Write-through caching has the benefit of improved data security. A sudden loss of power or a failing SVC, for instance, will not result in the loss of data. Under certain circumstances, such as when the write IO stream is sequential in nature and the SVCs are configured into redundant SVS, write-through caching may actually offer better performance. In such a SVS, to avoid data loss in the event of a failing SVC, write-back caching may be combined with inter-controller cached write data synchronization so that there is a backup of all uncommitted write data in the alternate controller in the redundant pair. The process of backing up write data to the alternate controller in real time as it comes in from the host may result in significant performance degradation. In this case, especially if the write IO stream is sequential in nature, write-through caching may actually yield better performance because it is not necessary to backup the data to the alternate controller to avoid data loss in the event of an SVC failure.

In an effort to provide the user with the ability to tune the write caching policy to a setting that he feels is most appropriate for the particular configuration and IO stream characteristics, a typical SVS will support the manual adjustment of the write caching policy. In many systems, this policy is dynamically adjustable, meaning that it takes effect immediately without the need to take associated LMU or perhaps even the entire system off line then bring it on line again. Furthermore, each LMU or even each logical unit that is presented to the host over the host-side IO device interconnect may have its own independently configurable write caching policy. Some SVSs may even support adjustment of the write caching policy on per-IO basis by information conveyed in the IO command information itself.

SUMMARY

As explained above, write-back caching, under many circumstances, offers improved performance over write-through caching. However, there are circumstances under which write-through caching policy is desirable because of data security considerations. Such circumstances may change with time, so that, under circumstances that apply during a first period of time, write-back may be the optimal caching policy taking into account both data security and performance while under different circumstances that apply during a second period of time, write-through may be the optimal policy, perhaps because of an enhanced risk of an event occurring that could result in the loss of uncommitted data that resides in the data cache. To adapt to such changes in circumstances, dynamically adjustable write data caching can be combined with a mechanism that initiates a write caching policy adjustment when a trigger event is registered. One common example of a trigger event that would cause a write policy adjustment is a change of state of a backup power source. While a backup power source, such as a battery, is in a state that allows it to sustain cached data until it can be committed to non-volatile storage (e.g., PSDs), the overall write caching policy may be set to write-back to enhance overall performance. If the state of the backup power source changes to one such that it can no longer sustain cached data until it can be committed (e.g., battery is not fully charged or the power source malfunctions in some way), the uncommitted data residing in the data cache may be immediately committed to non-volatile storage and the overall write caching policy may be modified to write-through to make sure that a sudden loss of power from the primary power source will not result in a loss of uncommitted cache data.

In general, write-back data caching will yield better performance compared to write-through data caching. However, as mentioned above, there are certain circumstances under which write-through caching policy may actually exhibit better performance than write-back performance. Under such circumstances, the user could manually adjust the write caching policy to a setting that optimizes performance. The user would typically have to monitor the nature of the host IO stream and performance characteristics associated with it and manually adjust the write caching policy setting accordingly. This process of monitoring and reconfiguration on the part of the user is an added cost to the overall cost of ownership and maintenance of the system. Automating the process can eliminate the need for such user monitoring and reconfiguration thereby eliminating this while still achieving the optimal levels of performance associated with keeping the write caching policy adjusted to its optimal setting for the circumstances at hand.

The current invention endeavors to achieve optimal performance under different kinds of IO load relative to current configuration and operational state by adjusting the write caching policy appropriately. This is referred to as "IO-stream adaptive write caching policy adjustment" because the write caching policy "adapts" to different configurations and different kinds of IO load. The prerequisite for this is the support of dynamic adjustment of the write caching policy. It also requires the implementation of a mechanism for determining when a write caching policy adjustment is appropriate based on IO load taking into consideration current configuration and operational state.

In one exemplified embodiment, a method is disclosed for performing adaptive write caching in a storage virtualization subsystem including at least one storage virtualization controller and a physical storage device (PSD) array, comprising at least one PSD, connected thereto, the method comprising: analyzing the characteristics of a stream of at least one write IO request sent out by a host entity; determining from said analyzing step whether said stream is substantially sequential; receiving a new write IO request by said subsystem from the host entity; and automatically performing write-through caching to write data associated with said new write IO request to said PSD array when said stream is determined substantially sequential, or automatically performing write-back caching to write said data associated with said new write IO request to said PSD array when said stream is determined not substantially sequential.

In another exemplified embodiment, a method is disclosed for performing adaptive write caching in a storage virtualization subsystem including at least one storage virtualization controller and a physical storage device (PSD) array, comprising at least one PSD, connected thereto, to write data from said controller pair to said PSD array, the method comprising: receiving a set of at least one write IO request by said subsystem from the host entity; determining an IO stream that is substantially sequential from said set of at least one write IO request; receiving a new write IO request by said subsystem from the host entity; and automatically performing write-through caching to write data associated with said new write IO request to said PSD array if said new write IO request is determined to belong to said IO stream, or automatically performing write-back caching to write data associated with said new write IO request to said PSD array if said new write IO request is determined not to belong to said IO stream.

In another exemplified embodiment, a method is disclosed for performing adaptive write caching in a storage virtualization subsystem including at least one storage virtualization controller and a physical storage device (PSD) array, comprising at least one PSD, connected thereto, to write data from said controller pair to said PSD array, the method comprising: receiving a set of at least one write IO request by said subsystem from a host entity; determining a set of at least one IO stream from said set of at least one write IO request; determining for each of said set of at least one IO stream whether it is substantially sequential; and automatically performing write-through caching to write data associated with a first new write IO request that is determined to belong to a first of said at least one IO stream that is substantially sequential to said PSD array, or automatically performing write-back caching to write data associated with a second new write IO request that is determined to belong to a second of said at least one IO stream that is not substantially sequential to said PSD array.

In another exemplified embodiment, a storage virtualization subsystem including at least one storage virtualization controller and a physical storage device (PSD) array, comprising at least one PSD, connected thereto, is disclosed for writing data from said at least one controller to said PSD array, comprising a write caching mechanism for performing adaptive write caching from said at least one storage virtualization controller to said PSD array, said write caching mechanism performing the following steps: receiving a set of at least one write IO request by said subsystem from a host entity; determining a set of at least one IO stream from said set of at least one write IO request; determining for each of said set of at least one IO stream whether it is substantially sequential; and automatically performing write-through caching to write data associated with a first new write IO request that is determined to belong to a first of said at least one IO stream that is substantially sequential to said PSD array, or automatically performing write-back caching to write data associated with a second new write IO request that is determined to belong to a second of said at least one IO stream that is not substantially sequential to said PSD array.

In another exemplified embodiment, a computer system comprising a storage virtualization subsystem (SVS) connected thereto, said SVS including at least one storage virtualization controller (SVC) and a physical storage device (PSD) array, comprising at least one PSD, connected thereto, is disclosed for writing data from said at least one controller to said PSD array, and comprising a write caching mechanism for performing adaptive write caching from said at least one SVC to said PSD array, said write caching mechanism performing the following steps: receiving a set of at least one write IO request by said subsystem from a host entity; determining a set of at least one IO stream from said set of at least one write IO request; determining for each of said set of at least one IO stream whether it is substantially sequential; and automatically performing write-through caching to write data associated with a first new write IO request that is determined to belong to a first of said at least one IO stream that is substantially sequential to said PSD array, or automatically performing write-back caching to write data associated with a second new write IO request that is determined to belong to a second of said at least one IO stream is not substantially sequential to said PSD array.

BRIEF DESCRIPTION OF THE DRAWINGS

The invention can be more fully understood by reading the following detailed description of the preferred embodiment, with reference made to the accompanying drawings as follows:

FIGS. 4A to 4D are flow charts showing the processes for determining which kind of write caching policies will be applied according to embodiments of this invention;

FIG. 5 is a diagram showing the example of the determination mechanism depicted in FIG. 4A;

FIG. 6 is a flow chart showing the process for determining which kind of write caching policy will be applied according to one embodiment of this invention;

FIGS. 8A to 8B are diagrams showing the examples of determination mechanisms depicted in FIG. 7A; and, FIG. 9 is a flow chart showing the process for determining which kind of write caching policy will be applied according to one further embodiment of this invention.

DESCRIPTION OF THE PREFERRED EMBODIMENTS

Figure 1:
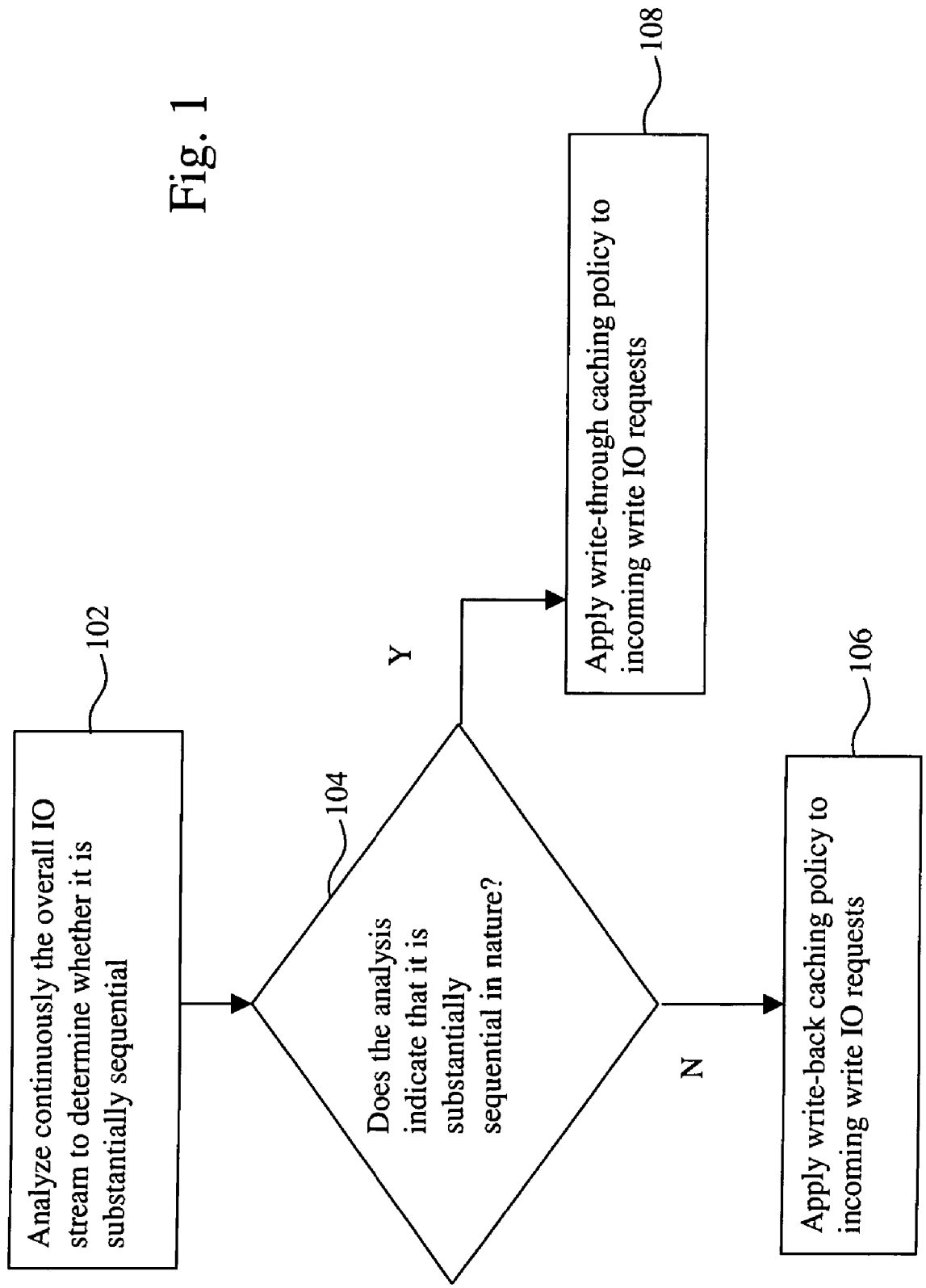
FIG. 1 is a flow chart illustrating the process for IO-stream adaptive write caching policy dynamic adjustment according to an embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

In general, for virtually any kind of IO load, write-back caching policy exhibits the best performance. However, as mentioned above, there are circumstances in which write-through caching policy will yield better performance for IO streams that are substantially sequential in nature. With such streams, mechanical latencies and overhead in the PSDs are reduced significantly and so can actually be overshadowed by performance bottlenecks elsewhere in the system that may be more severe when write-back caching policy is selected compared to when write-through is selected. These bottlenecks are related to the particular configuration, existing in some configurations and not in others. One such configuration in which write-back caching policy may deliver poorer performance than write-through under substantially sequential IO loads is redundant SVSs in which uncommitted data in the cache of one SVC is backed up to the alternate SVC. The process of copying uncommitted data to the alternate SVC to make sure it is backed up there can actually be the primary write performance limiting factor in such a subsystem when the write IO stream is substantially sequential in nature. So, under such configurations, it would be beneficial to dynamically adjust write caching policy based on the how sequential in nature the write IO stream is at the particular time.

A simple embodiment of this would be to continuously analyze the overall IO stream to determine whether it is substantially sequential. If the analysis indicates that it is substantially sequential in nature, then write-through caching policy would be applied to all incoming write IO requests until the current analysis indicates that it is no longer substantially sequential in nature, at which point write-back caching policy would be applied to all incoming write IO requests. The flow chart of this embodiment is depicted in FIG. 1.

FIG. 1 is a flow chart illustrating the process for IO-stream adaptive write caching policy dynamic adjustment according to an embodiment of this invention. In Step 102, the overall IO stream is continuously analyzed for determining whether it is substantially sequential. Step 104 uses the analysis to determine whether the IO stream is substantially sequential in nature. Step 106 applies write-back caching policy to incoming write IO requests if the IO stream is not substantially sequential in nature, or Step 108 is alternatively adopted to apply write-through caching policy to incoming write IO requests if the IO stream is substantially sequential in nature.

The determination of how sequential in nature the overall write IO stream is, in its simplest form, might be as follows: If each write IO request out of a certain number of successively received write IO requests (referred to here as the sequential stream threshold IO count) was contiguous with the preceding one, then the IO stream would be considered sequential in nature. Once the write IO stream is determined to be substantially sequential in nature by the above mechanism, only after the proportion of write IO requests that are not contiguous with the latest write IO request of the sequential stream over another certain number of successively received write IO requests (referred to as the sequential stream sustenance window) exceeds a threshold (referred to here as the non-sequential stream threshold IO proportion) will the write IO stream be considered no longer substantially sequential in nature. The flow chart of this determination mechanism is depicted in FIG. 2.

Figure 2:
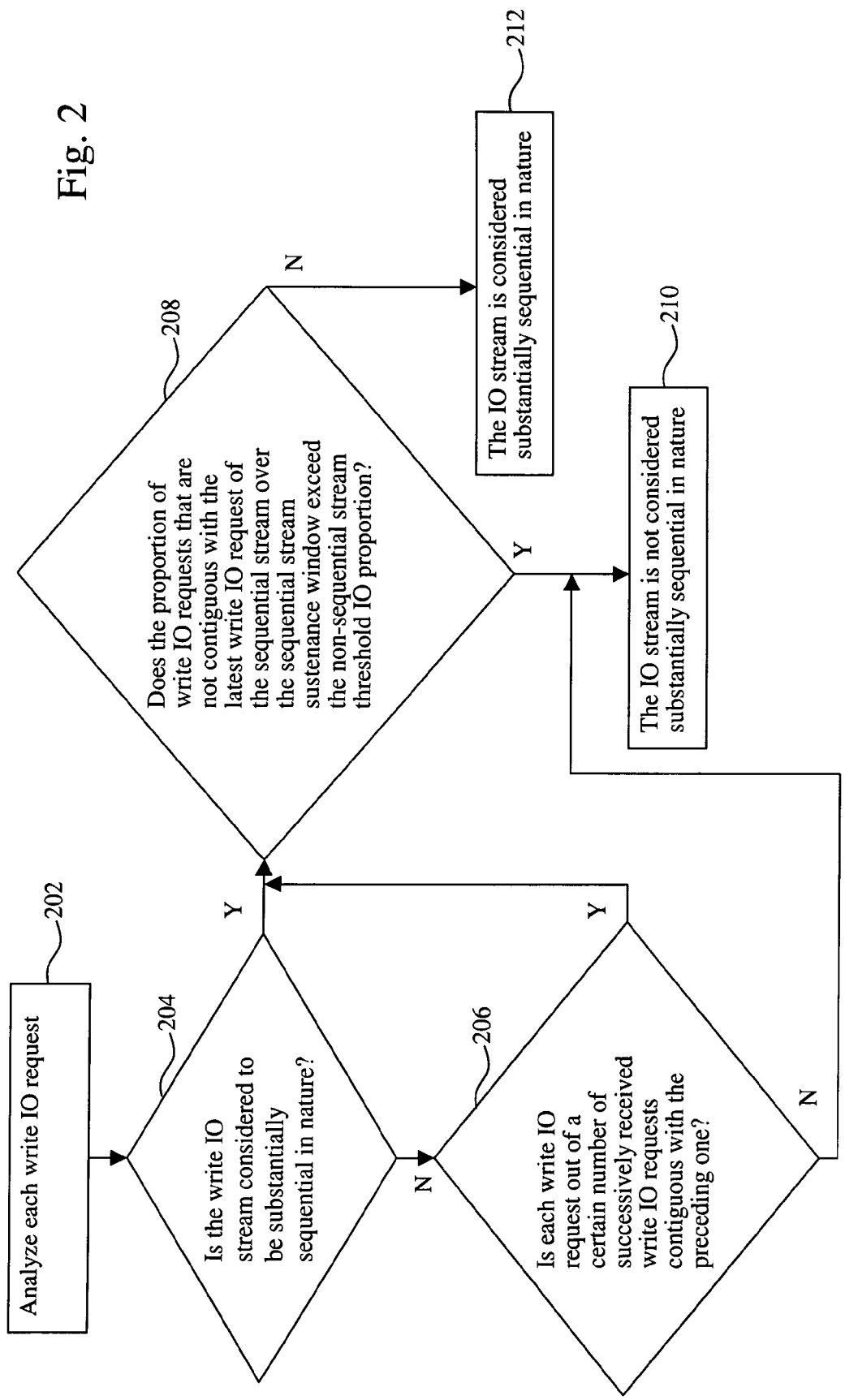
FIG. 2 is a flow chart illustrating the process for analyzing the overall IO stream to determine whether it is substantially sequential according to an embodiment of this invention.

FIG. 2 is a flow chart illustrating the process for analyzing the overall IO stream to determine whether it is substantially sequential according to an embodiment of this invention. To begin with, Step 202 analyzes each write IO request, Step 204 determines whether the write IO stream is considered to be substantially sequential in nature, and Step 206 further determines whether each write IO request out of a certain number of successively received write IO requests is contiguous with the preceding one if the determination made in step 204 is "No". Then, the procedure goes to Step 208 if the determination made in Step 204 or Step 206 is "Yes". Step 208 determines whether the proportion of write IO requests that are not contiguous with the latest write IO request of the sequential stream over the sequential stream sustenance window exceeds the non-sequential stream threshold IO proportion. Finally, the IO stream is not considered substantially sequential in nature in step 210 if the determination made in step 208 is "Yes" or step 206 is "No". Or, the IO stream is considered substantially sequential in nature in step 212 if the determination made in step 208 is "No".

The above embodiment would work satisfactorily when there is only one sequential write IO stream active at any one time. However, if multiple sequential write IO streams, each independent of the others, are being sent to the SVS, the SVS may not make the determination that the write IO stream is substantially sequential because write IOs from different streams would not be contiguous. To overcome this shortcoming, a more sophisticated embodiment of dynamic adjustment of write caching policy based on IO stream characteristics would be to select the write caching policy on an individual IO stream basis by using write-through caching policy for all write IOs that belong to IO streams that display a substantially sequential nature and using write-back caching policy for all write IOs that belong to streams that are not substantially sequential or for IOs that do not appear to belong to any particular stream.

The determination of what IOs constitute an IO stream and whether an IO stream is substantially sequential in nature might be made as follows: If a write IO request is contiguous with the latest write IO in an existing stream, then it is considered to belong to the stream and becomes the newest latest write IO of the stream. Otherwise, it is considered to be the first IO of a new write IO stream. The flow chart of this determination mechanism is depicted in FIG. 3.

Figure 3:
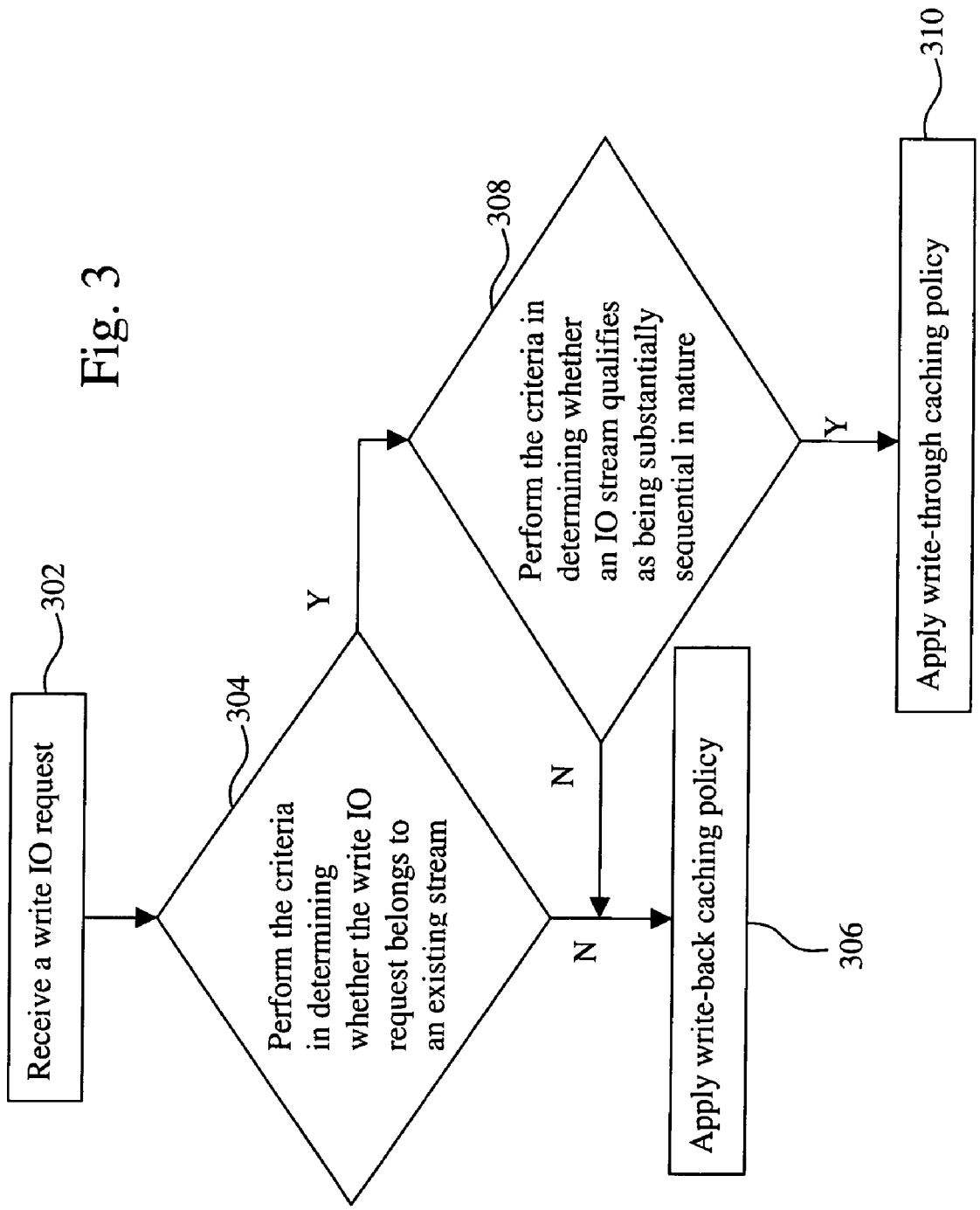
FIG. 3 is a flow chart showing the process for determining of whether an IO request belongs to an existing IO stream and determining of whether an existing IO stream is sequential.

FIG. 3 is a flow chart showing the process for determining of whether an IO request belongs to an existing IO stream and determining of whether an existing IO stream is sequential. To begin with, Step 302 receives a write IO request and Step 304 performs the criteria in determining whether the write IO request belongs to an existing stream. If the determination made in Step 304 is "Yes", the procedure goes to Step 308, which performs the criteria in determining whether an IO stream qualifies as being substantially sequential in nature. Finally, Step 306 applies write-back caching policy if the determination made in step 308 or step 304 is "No". Alternatively, Step 310 is adopted to apply write-through caching policy if the determination made in step 308 is "Yes".

Note that the determination of whether an IO request belongs to an existing IO stream and the determination of whether an existing IO stream is sequential can be performed either at the same time or at different times.

Figure 4A:
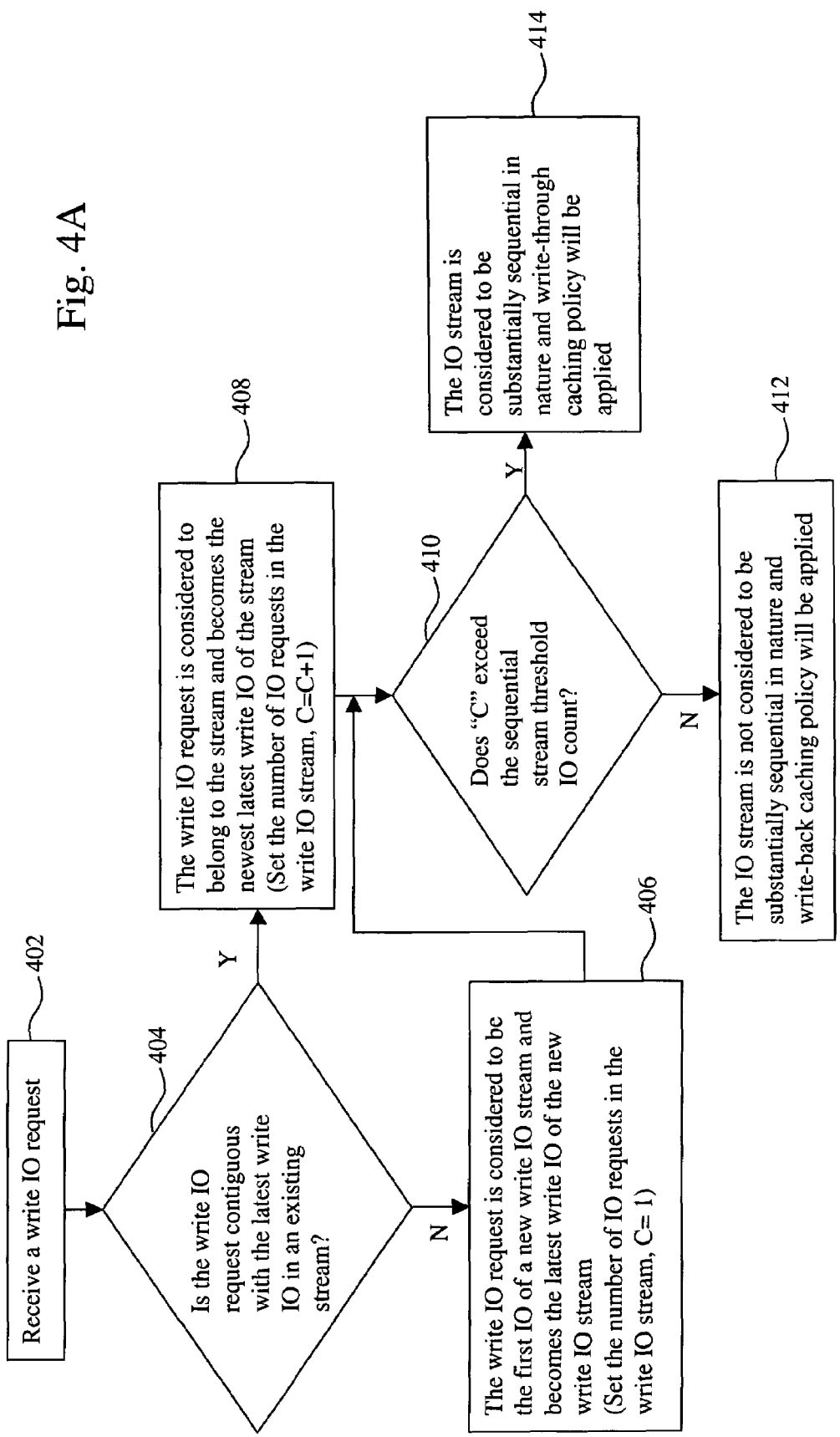

When the number of IO requests in a write IO stream exceeds a certain count (referred to here, once again, as the sequential stream threshold IO count), then the IO stream is considered to be sequential in nature and write-through caching policy will apply to all newly received write IOs that are determined to belong to that particular stream. The flow chart of this determination mechanism is depicted in FIG. 4A.

FIGS. 4A to 4D are flow charts showing the processes for determining which kind of write caching policies will be applied according to embodiments of this invention. The process of FIG. 4A includes the following steps. To begin with, Step 402 receives a write IO request and Step 404 determines whether the write IO request is contiguous with the latest write IO in an existing stream. If the determination in Step 404 is "No", the write IO request is considered to be the first IO of a new write IO stream and becomes the latest write IO of the new write IO stream and the number of IO requests "C" in the write IO stream is set to (C=1) in Step 406. Or, if the determination in Step 404 is "Yes", the write IO request is considered to belong to the stream and becomes the newest latest write IO of the stream and the number of IO requests "C" in the write IO stream is set to (C=C+1) in Step 408. Finally, Step 410 determines whether "C" exceeds the sequential stream threshold IO count. If the determination made in Step 410 is "No", the IO stream is not considered to be substantially sequential in nature and write-back caching policy will be applied in Step 412. Or, if the determination made in Step 410 is "Yes", the IO stream is considered to be substantially sequential in nature and write-through caching policy will be applied in Step 414. Note that, since each write IO stream has its own "C", which means the number of IO requests in the particular write IO stream, the "C" in step 406 is different from the "C" in step 408. The same reasoning applies in this specification.

Alternately, the total amount of data in the IO stream exceeding a certain amount (referred to here as sequential stream threshold data length) rather than the number of IO requests exceeding the sequential stream threshold IO count might be the primary criteria in determining when an IO stream is considered sequential in nature. The flow chart of this determination mechanism is depicted in FIG. 4B.

Figure 4B:
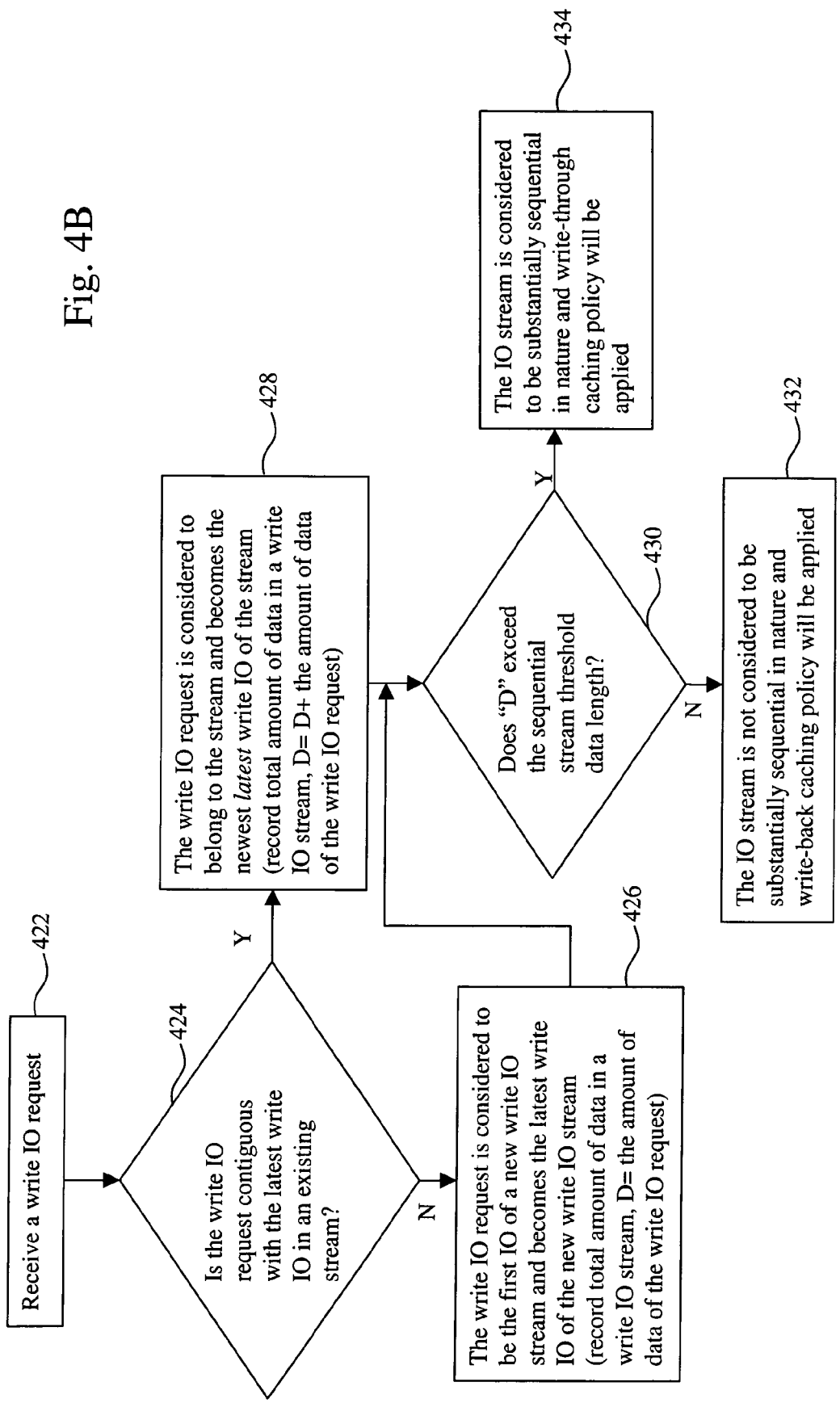

The process of FIG. 4B includes the following steps. To begin with, step 422 receives a write IO request and step 424 determines whether the write IO request is contiguous with the latest write IO in an existing stream. If the determination in Step 424 is "No", the write IO request is considered to be the first IO of a new write IO stream and becomes the latest write IO of the new write IO stream, and total amount of data "D" in a write IO stream is recorded as (D="the amount of data of the write IO request") in Step 426. Or, if the determination in Step 424 is "Yes", the write IO request is considered to belong to the stream and becomes the newest latest write IO of the stream, and the total amount of data "D" in a write IO stream is recorded as (D=D+"the amount of data of the write IO request") in Step 428. Finally, Step 430 determines whether "D" exceeds the sequential stream threshold data length. If the determination made in Step 430 is "No", the IO stream is not considered to be substantially sequential in nature and write-back caching policy will be applied in Step 432. Or, if the determination made in Step 430 is "Yes", the IO stream is considered to be substantially sequential in nature and write-through caching policy will be applied in Step 434. Note that, since each write IO stream has its own "D", which means the total amount of data in the particular write IO stream, the "D" in step 426 is different from the "D" in step 428. The same reasoning applies in this specification.

Alternately, either data length or IO count exceeding their respective thresholds or both data length and IO count exceeding their respective thresholds might serve as the criteria in determining when an IO stream is sequential. The flow charts of such determination mechanisms are depicted in FIG. 4C and FIG. 4D, respectively.

Figure 4C:
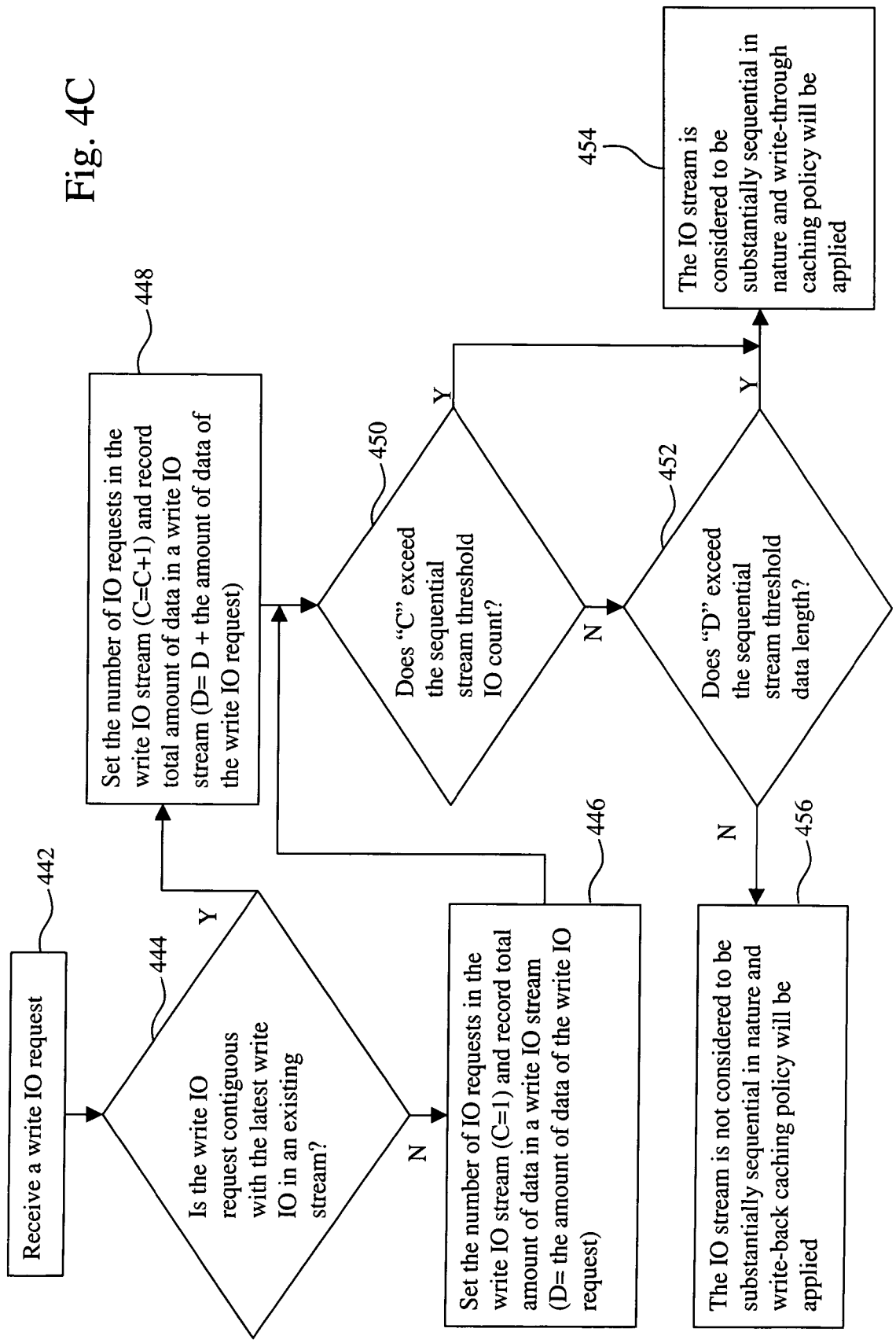

The process of FIG. 4C includes the following steps. To begin with, Step 442 receives a write IO request and Step 444 determines whether the write IO request is contiguous with the latest write IO in an existing stream. If the determination in Step 444 is "No", the number of IO requests "C" in the write IO stream is set to (C=1) and total amount of data "D" in a write IO stream is recorded as (D=the amount of data of the write IO request) in Step 446. Or, if the determination in step 444 is "Yes", the number of IO requests "C" in the write IO stream is set to (C=C+1) and total amount of data "D" in a write IO stream is recorded as (D=D+"the amount of data of the write IO request") in Step 448. Then, Step 450 determines whether "C" exceeds the sequential stream threshold IO count and Step 452 determines whether "D" exceeds the sequential stream threshold data length. If the determinations made in Steps 450 and 452 are both "No", the IO stream is not considered to be substantially sequential in nature and write-back caching policy will be applied in Step 456. Or, if the determination made in either Step 450 or 452 is "Yes", the IO stream is considered to be substantially sequential in nature and write-through caching policy will be applied in Step 454.

Moreover, the process of FIG. 4D includes the following steps. To begin with, Step 462 receives a write IO request and Step 464 determines whether the write IO request is contiguous with the latest write IO in an existing stream. If the determination in Step 464 is "No", the number of IO requests "C" in the write IO stream is set to (C=1) and total amount of data "D" in a write IO stream is recorded as (D="the amount of data of the write IO request") in Step 466. Or, if the determination in Step 464 is "Yes", the number of IO requests "C" in the write IO stream is set to (C=C+1) and total amount of data in a write IO stream is recorded as (D=D+"the amount of data of the write IO request") in Step 468. Then, Step 470 determines whether "C" exceeds the sequential stream threshold IO count and Step 472 determines whether "D" exceeds the sequential stream threshold data length. If the determinations made in either Step 470 or 472 is "No", the IO stream is not considered to be substantially sequential in nature and write-back caching policy will be applied in Step 476. Or, if the determination made in both Step 470 and 472 are "Yes", the IO stream is considered to be substantially sequential in nature and write-through caching policy will be applied in Step 474.

FIG. 5 is an example for explanation of the determination mechanism depicted in FIG. 4A, in which the sequential stream threshold IO count is assumed to be set as 2. Each write IO request entering the SVC is given a write IO sequence number, such as 1, 2, 3, and marked as I1, I2, I3, respectively. Each IO belonging to a particular IO stream is given an in-stream sequence number, such as 1, 2, 3, and marked as c1, c2, c3, respectively. In this example, I1 is the first write IO and thus a new IO stream is created and marked as S1. The I1 becomes the first IO of S1 and is marked as c1, and the latest IO of S1 as well. Since the sequential stream threshold IO count is not exceeded, S1 is marked "ns", which means "not substantially sequential" at the moment. When, the second write IO, I2, comes, it is determined not contiguous with I1 and thus does not belong to S1. Therefore, a second IO stream, S2, is created, of which the first (c1) and latest IO are both I2, and marked "ns" for the same reason as I1. Then I3 comes and is determined contiguous with I1 and thus belongs to S1. I3 becomes the second (c2) and the latest IO of S1 and is marked "ns". I4 is determined to belong to a new IO stream S3, marked c1 and "ns". For I5, it is determined to belong to a new IO stream S4, marked c1 and "ns", and for I6, S3, c2 and "ns". When I7 comes, it is determined contiguous with I6, and thus belongs to S3 as I6 and becomes c3. Since the sequential stream threshold IO count (2) has been exceeded, S3 in turn is determined substantially sequential, and I7 is marked "s" accordingly. Such process continues for all subsequent IOs. For all the IO streams, the first two IOs are marked with an "ns" because the sequential stream threshold IO count, 2 in this example, has not been exceeded, while for all IOs in each stream other than the first two, "s" will be marked meaning that the IO stream is determined substantially sequential since third IO, c3.

An improvement on the above method of determining what IOs constitute an IO stream and whether an IO stream is substantially sequential in nature would be to require that an IO stream must grow at a minimum rate relative to the incoming IO or data rate (referred to as minimum stream survival growth rate) to "survive" as an IO stream. FIG. 6 depicts the flow chart of such an embodiment.

The process of FIG. 6 includes the following steps. To begin with, Step 602 receives a write IO request. Then, Step 604 performs the criteria in determining whether the write IO request belongs to an existing stream, Step 608 performs the criteria in determining whether an IO stream is a viable IO stream, and Step 610 performs the criteria in determining whether an IO stream qualifies as being substantially sequential in nature. If determinations made in Steps 604, 608 and 610 are all "Yes", write-through caching policy will be applied in Step 612. Or, if determination made in any one of Steps 604, 608 and 610 is "No", write-back caching policy will be applied in Step 606.

Figure 7A:
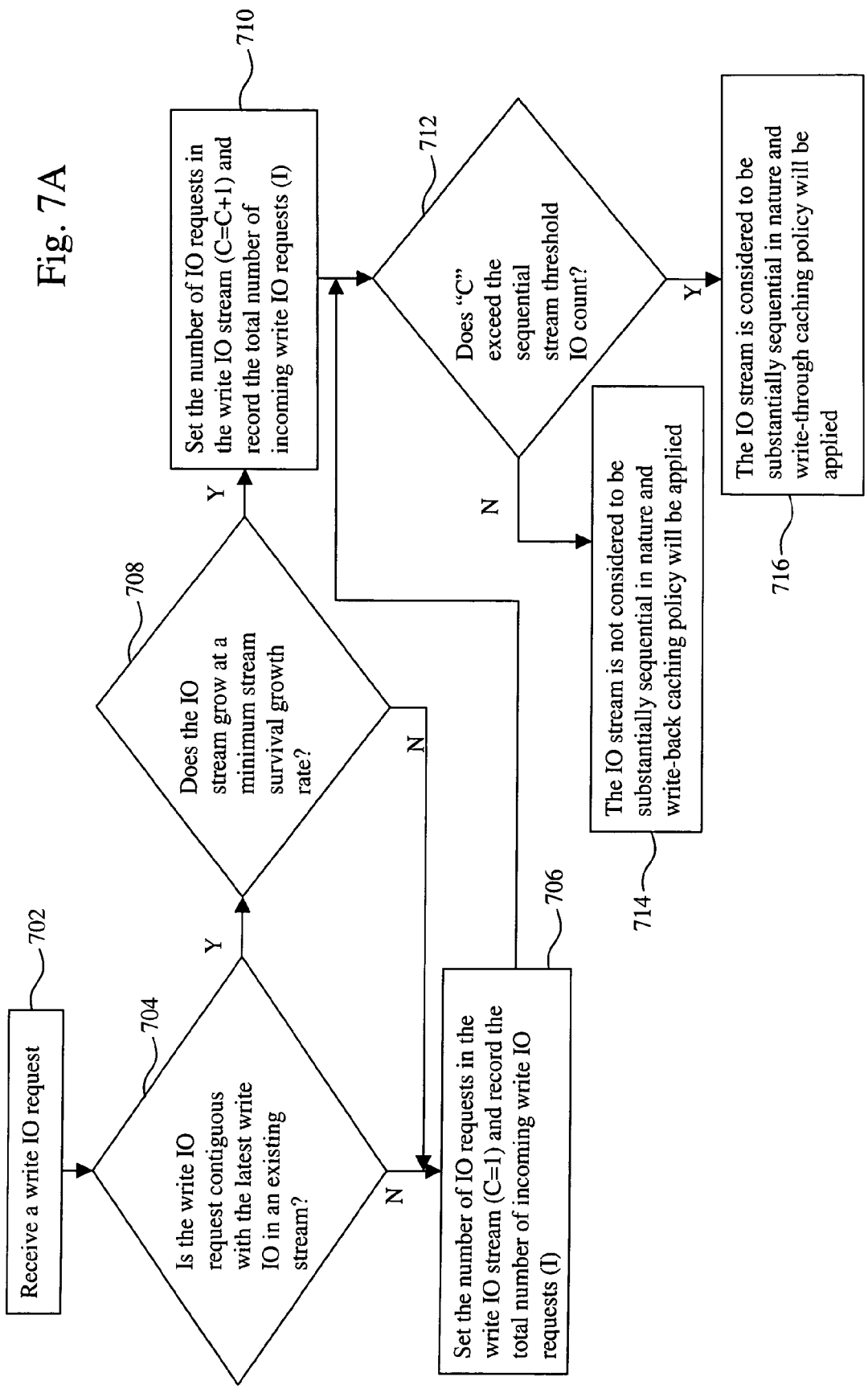
FIGS. 7A to 7B are flow charts showing the processes for determining which kind of write caching policies will be applied according to further embodiments of this invention.

This rate might be the minimum number of write IO requests added to an IO stream per total number of incoming write IO requests, which is depicted in FIG. 7A.

The process of FIG. 7A includes the following steps. To begin with, step 702 receives a write IO request. Then, Step 704 determines whether the write IO request is contiguous with the latest write IO in an existing stream, and Step 708 determines whether the IO stream grows at a minimum stream survival growth rate. If the determinations made in Steps 704 and 708 are both "Yes", the number of IO requests "C" in the write IO stream is set (C=C+1) and the total number of incoming write IO requests is recorded as (I) in Step 710. Or, if the determination made in either Step 704 or 708 is "No", the number of IO requests "C" in the write IO stream is set to (C=1) and the total number of incoming write IO requests is recorded as (I) in Step 706. Finally, Step 712 determines whether "C" exceeds the sequential stream threshold IO count. If the determination made in Step 712 is "No", the IO stream is not considered to be substantially sequential in nature and write-back caching policy will be applied. Or, if the determination made in Step 712 is "Yes", the IO stream is considered to be substantially sequential in nature and write-through caching policy will be applied.

Figure 7B:
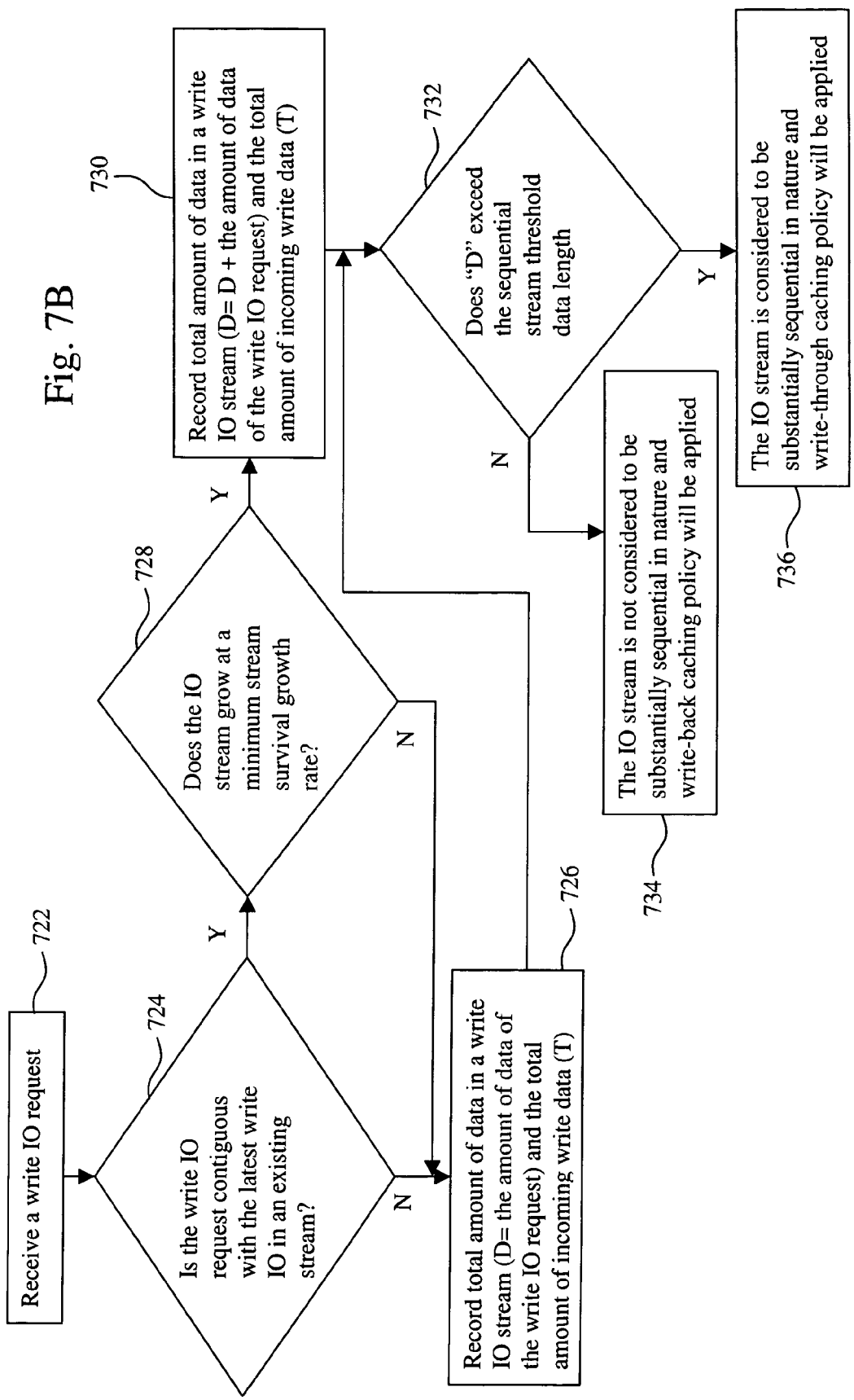

Alternately, data amount rather than IO count could be used to determine the rate as the minimum amount of write data added to an IO stream per total amount of incoming write data, which is depicted in FIG. 7B. Or the growth of an IO stream may have to meet one or the other or both of the above rate criteria to continue to be considered a viable IO stream.

The process of FIG. 7B includes the following steps. To begin with, Step 722 receives a write IO request. Then, Step 724 determines whether the write IO request is contiguous with the latest write IO in an existing stream, and Step 728 determines whether the IO stream grows at a minimum stream survival growth rate. If the determinations made in Steps 724 and 728 are both "Yes", total amount of data "D" in a write IO stream is recorded as (D=D+"the amount of data of the write IO request") and the total amount of incoming write data is recorded as (T) in Step 730. Or, if the determination made in either Step 724 728 is "No", total amount of data "D" in a write IO stream is recorded as (D="the amount of data of the write IO request") and the total amount of incoming write data is recorded as (T) in Step 726. Finally, Step 732 determines whether "D" exceeds the sequential stream threshold data length. If the determination made in Step 732 is "No", the IO stream is not considered to be substantially sequential in nature and write-back caching policy will be applied. Or, if the determination made in Step 732 is "Yes", the IO stream is considered to be substantially sequential in nature and write-through caching policy will be applied.

Figure 8A:
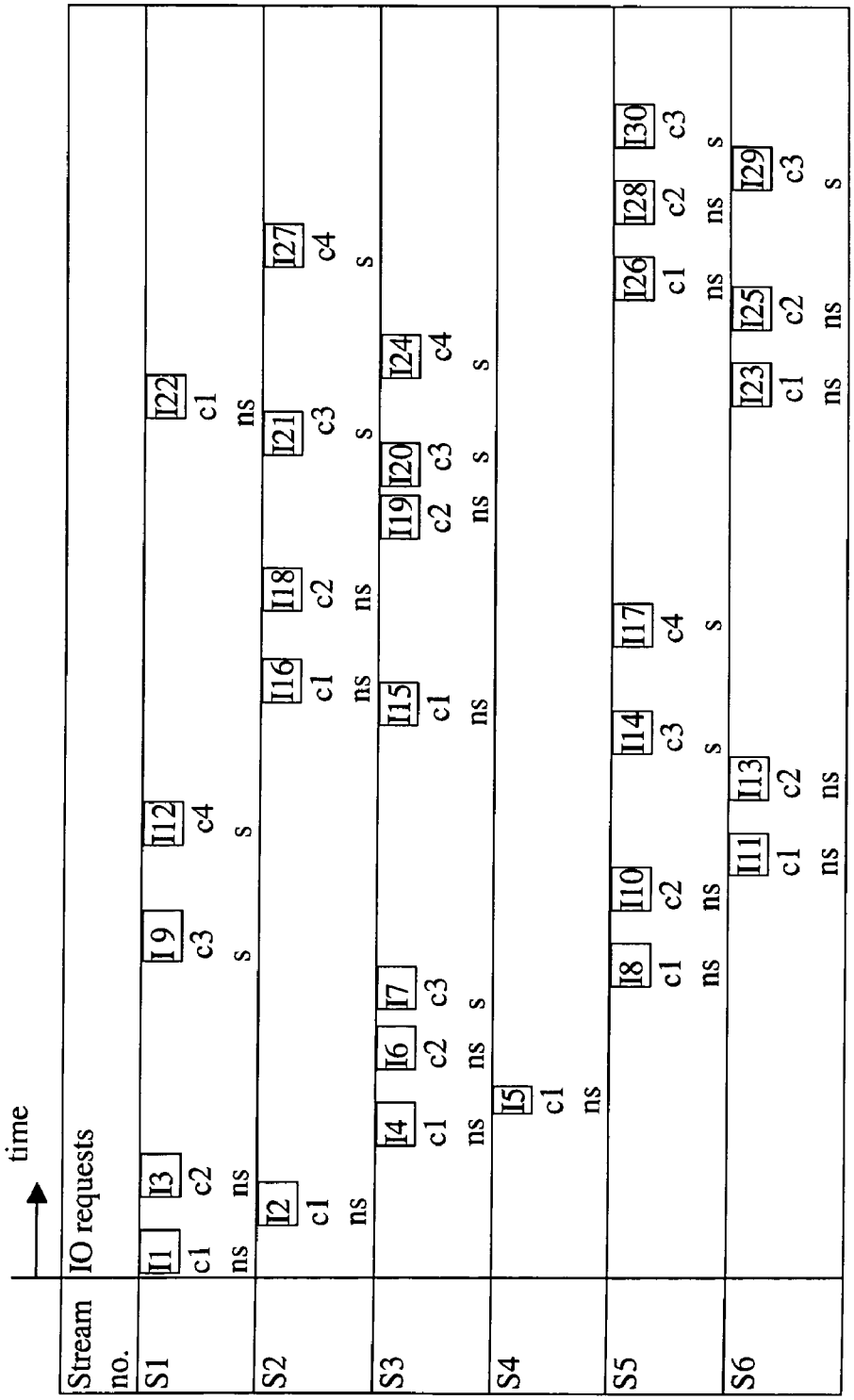

FIG. 8A is an example for explanation of the determination mechanism depicted in FIG. 7A, in which the minimum stream survival growth rate is assumed to be set as 14% and the sequential stream threshold IO count is assumed to be set as 2. In this example, there are various approaches to calculate the growth rate of an IO stream. One straightforward approach is to calculate the growth rate on the basis of only the latest IO request. For example, if one out of seven latest incoming IOs is determined to belong to a particular IO stream, the growth rate will be $1/7$, or 14.3%, just exceeding the minimum stream survival growth rate, while one out of eight will make growth rate $1/8$, or 12.5%, which is just below the minimum stream survival growth rate. Therefore, the growth rate based on only the latest IO in a stream can be calculated by one over the difference of the write IO request sequence number between the latest IO and its predecessor. For example, in S1, the growth rate for I3 is $1/(3-1)=1/2$, or 50%; for I9, it is $1/(9-3)=1/6$, or 16.7%, and for I12, $1/(12-9)=1/3$, or 33.3%, and for I22, $1/10$, or 10%. Since the minimum stream survival growth rate is 14%, S1 will be determined viable until I22. When I22 comes, since the growth rate of S1 is below 14%, the in-stream sequence number is reset to 1(c1) and S1 is marked as "ns" as if S1 is a newly created IO stream started with I22. Or it can be explained as S1 is not viable for the time being, and will be viable only if after I22, the requirements of both the minimum stream survival growth rate and the sequential stream threshold IO count are fulfilled. Please take a look at S5, since I26 and its predecessor I17 separate far apart, the growth rate $1/(26-17)=1/9$, or 11.1%, thus falls down below the minimum stream survival growth rate and thus the in-stream sequence number is reset to 1(c1) and S5 is marked as "ns". After the appearance of I28 and I30 in S5, however, the growth rate is kept above 14% and the in-stream sequence number is accumulated to 3, S5 is viable again and thus performs write-through policy now.

FIG. 8B is another example for explanation of the determination mechanism depicted in FIG. 7A, in which the same minimum stream survival growth rate and the sequential stream threshold IO count and approach to calculate the growth rate as those of the example in FIG. 8A are used. In this example, when an IO stream is determined not viable, it will not be viable again. In stead, a new IO stream will be created for the new IO, and the new IO will become the first IO of the new IO stream. The non-viable IO stream will be ignored. Please take a look at S3, in which the new comer I15 has a growth rate of $1/(15-7)=1/8=12.5\%<14\%$, and thus S3 is determined non-viable. I15 then becomes c1 of a newly created IO stream S7, with the in-stream sequence number reset to 1(c1) and marked as "ns".

Please refer to FIG. 9. A further refinement would be to normalize the total number of incoming write IO requests or amount of write data to the number of IO streams currently in existence before comparing it against the "minimum stream survival growth rate". In this case, the normalized growth rates would be the number of write IO requests added to an IO stream per (number of incoming write IO requests per existing IO stream) or the amount of write data added to an IO stream per (amount of incoming data per existing IO streams). In other words, the normalized growth rate=(growth rate*number of existing IO streams). Alternatively, the refinement could be to normalize the minimum stream survival growth rates to the number of IO streams currently in existence. In this case, the normalized minimum stream survival growth rates would be (minimum number of write IO requests added to an IO stream per number of incoming write IO requests) per existing IO stream or (the minimum amount of write data added to an IO stream per amount of incoming data) per existing IO streams. In other words, (the normalized minimum stream survival growth rate)=(the minimum stream survival growth rate)/(number of existing IO streams).

The process of FIG. 9 includes the following steps. To begin with, Step 902 receives a write IO request. Then, Step 904 performs the criteria in determining whether the write IO request belongs to an existing stream, Step 908 the normalized criteria in determining whether an IO stream is a viable IO stream, and Step 910 performs the criteria in determining whether an IO stream qualifies as being substantially sequential in nature. If determinations made in Steps 904, 908 and 910 are all "Yes", write-through caching policy will be applied in Step 912. Or, if determination made in any one of Steps 904, 908 and 910 is "No", write-back caching policy will be applied in step 906.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for performing adaptive write caching in a storage virtualization subsystem including at least one storage virtualizaion controller (SVC) and a physical storage device (PSD) array connected to said at least one SVC, the method comprising:

analyzing the characteristics of a stream of at least one write input/output (IO) request sent out by a host entity, thereby generating a result;

determining from said analyzing step whether said stream is substantially sequential in accordance with said result;

receiving a new write IO request by said subsystem from the host entity; and automatically performing write-through caching to write data associated with said new write IO request to said PSD array when said stream is determined substantially sequential, and automatically performing write-back caching to write said data associated with said new write IO request to said PSD array when said stream is determined not substantially sequential.

2. The method of claim 1, wherein said stream is determined substantially sequential when each write IO request out of a certain number of successively received write IO requests is contiguous with the preceding one.

3. The method of claim 1, wherein said stream is determined substantially sequential at a first time; and said stream is determined not substantially sequential at a second time later than said first time if the proportion of write IO requests not contiguous with the latest write IO request in said stream over a certain number of successively received write IO requests exceeds a first threshold.

4. A method for performing adaptive write caching in a storage virtualization subsystem including at least one storage virtualization controller (SVC) and a physical storage device (PSD) array connected to said at least one SVC for writing data from said at least one SVC to said PSD array, the method comprising:
receiving atleast one write input/output (IO) request by said subsystem from a host entity;
determining at least one IO stream that is substantially sequential from said at least one write IO request;
receiving a new write IO request by said subsystem from the host entity; and
automatically performing write-through caching to write data associated with said new write IO request to said PSD array if said new write IO request is determined to belong to said at least one IO stream that is substantially sequential, and automatically performing write-back caching to write data associated with said new write IO request to said PSD array if said new write IO request is determined not to belong to said at least one IO stream that is substantially sequential.

5. The method of claim 4, wherein said at least one IO stream is determined substantially sequential when said at least one IO stream comprises a certain number of contiguous IO requests.

6. The method of claim 4, wherein said at least one IO stream comprises a certain number of contiguous IO requests, and a proportion of write IO requests that are not contiguous with the latest write IO request of said IO stream over a sequential stream sustenance window is defined, and when said proportion does not exceed a non-sequential stream threshold IO proportion, said at least one IO stream is determined substantially sequential.

7. A method for performing adaptive write caching in a storage virtualization subsystem including at least one storage virtualization controller (SVC) and a physical storage device (PSD) array connected to said at least one SVC for writing data from said at least one SVC to said PSD array, the method comprising:
receiving a plurality of write input/output (IO) requests by said subsystem from a host entity;
determining a plurality of IO streams from said write IO requests;
determining for each of said IO streams whether it is substantially sequential; and
automatically performing write-through caching to write to said PSD array data associated with a first new write IO request that is determined to belong to a first IO stream of said IO streams that is substantially sequential, and automatically performing write-back caching to write to said PSD array data associated with a second new write IO request that is determined to belong to a second IO stream of said IO streams that is not substantially sequential.

8. The method of claim 7, wherein one of said IO streams is determined substantially sequential when said one IO stream comprises a certain number of contiguous IO requests.

9. The method of claim 4, wherein, after being determined substantially sequential, said at least one IO stream maintains its determination of being substantially sequential when a growth rate thereof maintains a minimum stream survival growth rate.

10. The method of claim 4, wherein said at least one IO stream is determined non-viable when a growth rate thereof is below a minimum stream survival growth rate.

11. The method of claim 4, wherein said at least one IO stream is determined not substantially sequential when a growth rate thereof is below a minimum stream survival growth rate.

12. The method of claim 9, wherein said minimum stream survival growth rate is normalized by the number of existing IO streams.

13. The method of claim 10, wherein said minimum stream survival growth rate is normalized by the number of existing IO streams.

14. The method of claim 11, wherein said minimum stream survival growth rate is normalized by the number of existing IO streams.

15. The method of claim 9, wherein said growth rate is normalized by the number of existing IO streams.

16. The method of claim 10, wherein said growth rate is normalized by the number of existing IO streams.

17. The method of claim 11, wherein said growth rate is normalized by the number of existing IO streams.

18. A storage virtualization subsystem including at least one storage virtualization controller (SVC) and a physical storage device (PSD) array connected to said at least one SVC for writing data from said at least one SVC to said PSD array, and comprising a write caching mechanism for performing adaptive write caching from said at least one SVC said PSD array, said write caching mechanism performing the following steps:
receiving at lease one write input/output (IO) request by said subsystem from a host entity;
determining atleast one IO stream that is substantially sequential from said least one write IO request;
receiving a new write IO request by said subsystem from said host entity; and
automatically performing write-through caching to write data associated with said new write IO request to said PSD array if said new write IO request is determined to belong to said at least one IO stream that is substantially sequential, and automatically performing write-back caching to write data associated with said new write IO request to said PSD array if said new write IO request is determined not to belong to said at least one IO stream that is substantially sequential.

19. The storage virtualization subsystem of claim 18, wherein said at least one IO stream is determined substantially sequential when said at least one IO stream comprises a certain number of contiguous IO requests.

20. The storage virtualization subsystem of claim 18, wherein said at least one IO stream comprises a certain number of contiguous IO requests, and a proportion of write IO requests that are not contiguous with the latest write IO request of said at least one IO stream over a sequential stream sustenance window is defined, and when said proportion does not exceed a non-sequential stream threshold IO proportion, said at least one IO stream is determined substantially sequential.

21. A computer system comprising a storage virtualization subsystem (SVS) connected thereto, said SVS including at least one storage virtualization controller (SVC) and a physical storage device (PSD) array connected to said at least one SVC for writing data from said at least one SVC to said PSD array, and comprising a write caching mechanism for performing adaptive write caching from said at least one SVC to said PSD array, said while caching mechanism performing the following steps:

receiving at least one write input/output (IO) request by said subsystem from a host entity;

determining at least one IO stream that is substantially sequential from said at least one write IO request;

receiving a new write IO request by said subsystem from said host entity; and automatically performing write-through caching to write data associated with said new write IO request to said PSD array if said new write IO request is determined to belong to said at least one IO stream that is substantially sequential, and automatically performing write-back caching to write data associated with said new write IO request to said PSD array if said new write IO request is determined not to belong to said at least one IO stream that is substantially sequential.

22. The computer system of claim 21, wherein said at least one IO stream is determined substantially sequential when said at least one IO stream comprises a certain number of contiguous IO requests.

23. The computer system of claim 21, wherein said at least one IO stream comprises a certain number of contiguous IO requests, and a proportion of write IO requests that are not contiguous with the latest write IO request of said atleast one IO stream over a sequential stream sustenance window is defined, and when said proportion does not exceed a non-sequential stream threshold IO proportion, said at least one IO stream is determined substantially sequential.

* * * * *